United States Patent
Arakawa

(10) Patent No.: US 9,753,320 B2
(45) Date of Patent: Sep. 5, 2017

(54) LIGHT DIFFUSION SHEET, AND BACKLIGHT UNIT FOR LIQUID CRYSTAL DISPLAY DEVICE

(71) Applicant: KEIWA INC., Osaka (JP)

(72) Inventor: Akira Arakawa, Osaka (JP)

(73) Assignee: Keiwa Inc., Osaka (JP)

(*) Notice: Subject to any disclaimer, the term of this patent is extended or adjusted under 35 U.S.C. 154(b) by 73 days.

(21) Appl. No.: 14/503,571

(22) Filed: Oct. 1, 2014

(65) Prior Publication Data
US 2015/0098210 A1    Apr. 9, 2015

(30) Foreign Application Priority Data
Oct. 3, 2013 (JP) ................................. 2013-208350

(51) Int. Cl.
G02F 1/1335 (2006.01)
G02B 5/02 (2006.01)

(52) U.S. Cl.
CPC ..... *G02F 1/133504* (2013.01); *G02B 5/0226* (2013.01); *G02F 1/133615* (2013.01); *G02F 2001/133614* (2013.01)

(58) Field of Classification Search
CPC ... G02B 5/0226; G02B 6/0061; G02B 6/0051
See application file for complete search history.

(56) References Cited

U.S. PATENT DOCUMENTS

2002/0114169 A1    8/2002  Harada et al.
2006/0109682 A1*   5/2006  Ko ....................... G02B 6/0051
                                                        362/607
2008/0079869 A1    4/2008  Paek et al.
2012/0182762 A1*   7/2012  Hu ....................... G02B 6/0023
                                                        362/606
2013/0286324 A1*  10/2013  Huang ............... G02F 1/133605
                                                         349/61

FOREIGN PATENT DOCUMENTS

CN    101441289    5/2009
CN    101961940    2/2011
CN    102573228    7/2012
(Continued)

*Primary Examiner* — Anh Mai
*Assistant Examiner* — Zachary J Snyder
(74) *Attorney, Agent, or Firm* — Norris McLaughlin & Marcus, P.A.

(57) ABSTRACT

A light diffusion sheet capable of inhibiting emission of blue light, and a backlight unit for a liquid crystal display device. The light diffusion sheet includes: a transparent substrate layer; and a light diffusion layer overlaid on the front face side of the substrate layer. The light diffusion layer is a light diffusion sheet for a backlight unit of a liquid crystal display device containing a light-diffusing agent and a binder covering the light-diffusing agent, and includes a component that attenuates blue light. The blue light attenuation component is preferably a yellow fluorescent material that generates yellow light through excitation by blue light, or a light absorbing agent that absorbs blue light. The light diffusion layer preferably includes the blue light attenuation component. Preferably, the light-diffusing agent is resin beads, and the blue light attenuation component is included in the resin beads.

13 Claims, 5 Drawing Sheets

(56) References Cited

FOREIGN PATENT DOCUMENTS

| | | |
|---|---|---|
| JP | 2005-107108 | 4/2005 |
| JP | 2006-146115 | 6/2006 |
| JP | 2007-133173 | 5/2007 |
| JP | 2009-229878 | 10/2009 |
| JP | 2012-123046 | 6/2012 |
| JP | 2013-208350 | 2/2016 |
| KR | 20070110584 | 11/2007 |
| KR | 20080029071 | 4/2008 |
| TW | I263821 | 10/2006 |

* cited by examiner

LIGHT DIFFUSION SHEET, AND BACKLIGHT UNIT FOR LIQUID CRYSTAL DISPLAY DEVICE

BACKGROUND OF THE INVENTION

Field of Invention

The present invention relates to a light diffusion sheet, and a backlight unit for a liquid, crystal display device.

Description of the Related Art

Backlight systems, which illuminate a liquid crystal layer from behind, are in widespread use as a transmissive liquid crystal display device, and the transmissive liquid crystal display device is equipped with an edge-lit (side-lit) backlight unit, an immediate beneath type backlight unit or the like on the back face side of the liquid crystal layer. The edge-lit backlight unit 41 is generally equipped with a light source 42, an optical waveguide plate 43 in the form of a rectangular plate arranged with its edge aligned with the light source 42, and a plurality of optical sheets 44 superposed on the front face side of the optical waveguide plate 43, as shown in FIG. 5 (see Japanese Unexamined Patent Application, Publication No. 2005-107108). LEDs (light emitting diodes) and cold-cathode tubes and the like are used as the light source 42, and the LEDs are currently in widespread use from the viewpoint of the size reduction, energy saving, and the like. In addition, the optical sheet 44 has optical functions such as diffusion and refraction of the transmitted rays of light and the like, and as the optical sheet 44, (1) a light diffusion sheet 45 which is disposed on the front face side of the optical waveguide plate 43 and primarily has a light diffusion function, and (2) a prism sheet 46 which is disposed on the front face side of the light diffusion sheet 45 and has a refraction function toward a normal direction side, and the like are utilized.

With regard to the functions of the backlight unit 41, in brief; first, the rays of light entering the optical waveguide plate 43 from the light source 42 are reflected on reflection dots or a reflection sheet (not shown in the Figure) on the back face of the optical waveguide plate 43 as well as on each lateral face, and are emitted from the front face of the optical waveguide plate 43. The rays of light, emitted from the optical waveguide plate 43 enter a light diffusion sheet 45, and are substantially uniformly diffused and emitted from its front face. The rays of light emitted from the front face of the light diffusion sheet 45 enter the prism sheet 46, are refracted by a plurality of protruding and streaking prism portions formed on the front face toward a normal direction and emitted, and illuminate the entire liquid crystal layer (not shown in the Figure) located further above.

PRIOR ART DOCUMENTS

Patent Documents

Patent Document 1: Japanese Unexamined Patent Application, Publication No. 2005-107108

SUMMARY OF THE INVENTION

Problems to be Solved by the Invention

Meanwhile, LEDs have been in widespread use nowadays as the light source 42 as described above, and since blue LEDs have been also employed as the light source 42, intensity of blue light having a wavelength of 380 nm to 500 nm included in rays of light from the backlight has been increasing. Moreover, the blue light, which may be referred to as "blue ray", has a short wavelength and high energy among visible radiations, and deleterious effects such as damage to retina, fatigue of the eye, failure of eyesight and sleep disorder resulting from seeing for a long period of time have been feared.

The present invention was made in view of the above-mentioned circumstances, and an object of the present invention is to provide: a light diffusion sheet capable of inhibiting emission of blue light; and a backlight unit for a liquid crystal display device that achieves inhibition of the emission of blue light by means of the light diffusion sheet.

Means for Solving the Problems

The light diffusion sheet according to an aspect of the present invention made for solving the aforementioned problems includes: a transparent substrate layer; and a light diffusion layer overlaid on the front face side of the substrate layer, the light diffusion layer being a light diffusion sheet for a backlight unit of a liquid crystal display device containing a light-diffusing agent and a binder covering the light-diffusing agent, and including a component that attenuates the blue light.

Since the light diffusion sheet has a component that attenuates blue light (hereinafter, may be also referred to as "blue light attenuation component"), emission of the blue light can be inhibited. In addition, since a light-diffusing agent and a binder covering the light-diffusing agent are contained in the light diffusion layer of the light diffusion sheet, the light diffusion layer enables rays of light to be substantially uniformly diffused. Therefore, the light diffusion sheet can over the entire face, substantially uniformly decrease the blue light included in the rays of light emitted from the front face side.

The blue light attenuation component is preferably a yellow fluorescent material that generates yellow light through excitation by the blue light, or a light absorbing agent that absorbs the blue light. Thus, emission of the blue light can be suitably inhibited.

The light diffusion layer preferably includes the blue light attenuation component. Due to the light diffusion layer having both the light diffusion function and a blue light attenuation function in this manner, blue light included in the rays of light emitted from the front face side can be suitably and substantially uniformly reduced over the entire face, and in turn occurrence of color heterogeneity in the face can be effectively inhibited. In addition, according to such a configuration, necessity of separately providing other member, layer, etc., for inhibiting the emission of the blue light is obviated, thereby enabling reduction in thickness of the liquid crystal display device to be facilitated.

It is preferred that the light-diffusing agent is resin beads, and the blue light attenuation component is included in the resin beads. Thus, while attenuating a part of the blue light entered into the beads, remaining blue light can be substantially uniformly diffused and emitted from the front face side. Therefore, the light diffusion sheet enables the blue light emitted from the front face side to be substantially uniformly attenuated, and alteration of chromaticity can be accurately prevented.

The blue light attenuation component preferably included in the binder. Such a configuration also enables emission of the blue light to be inhibited while the rays of light are substantially uniformly diffused.

It is preferred that the binder includes a light absorbing agent that allows visible light other than the blue light to be attenuated. Thus, visible light other than the blue light can be substantially uniformly reduced over the entire face, whereby alteration of chromaticity resulting from attenuation of the blue light can be suitably inhibited. In addition, due to the light diffusion layer containing the light absorbing agent that allows visible light other than the blue light to be attenuated, the light diffusion sheet can prevent an increase in the number of components, thereby enabling reduction in thickness of the liquid crystal display device to be facilitated.

It is preferred that the substrate layer includes the blue light attenuation component. Thus, rays of light including reduced blue light can be substantially uniformly diffused in the light diffusion layer, and emitted from the front face side. In addition, according to such a configuration, necessity of separately providing other member, layer, etc., for inhabiting the emission of the light is obviated, thereby enabling reduction in thickness of the liquid crystal display device to be facilitated.

It is preferred that a sticking preventive layer including beads dispersed in a binder is provided on the back face side of the substrate layer, and the blue light attenuation component is included in the binder of the sticking preventive layer. Thus, sticking of the light diffusion sheet with the optical waveguide plate and/or other optical sheet each disposed on the back face side can be prevented. In addition, according to such a configuration, the blue light attenuation component is substantially uniformly dispersed along a planar direction of the sticking preventive layer, whereby the blue light can be substantially uniformly reduced over the entire face. Furthermore, necessity of separately providing other member, layer, etc., for inhibiting the emission of the blue light is obviated, thereby enabling reduction in thickness of the liquid crystal display device to be facilitated.

The light diffusion sheet is preferably a light diffusion sheet for use at the top. Thus, blue light included in the rays of light substantially uniformly entered from the back face side is substantially uniformly reduced over the entire face, and can be substantially uniformly emitted from the front face side. It is to be noted that the light diffusion sheet for use a the tonic as referred to herein is disposed on the front face side of a lens sheet such as a prism sheet, and has functions of preventing moire, protecting the lens sheet, and the like, as well as a function of increasing a viewing angle through somewhat diffusing rays of light which had been condensed along a normal line direction.

In addition, the back light unit for a liquid crystal display device according to another aspect of the present invention is characterized by including the light diffusion sheet having the above configuration in a backlight unit for a liquid crystal display device that allows rays of light radiated from a lamp to be dispersed and leads the rays to the front face side.

Since the backlight unit for a liquid crystal display device has the light diffusion sheet including a blue light attenuation component, emission of the blue light can be inhibited. In addition, since a light-diffusing agent and a binder covering the light-diffusing agent are contained in the light diffusion layer of the light diffusion sheet in the backlight unit for a liquid crystal display device, the light diffusion layer enables rays of light to be substantially uniformly diffused. Therefore, the backlight unit for a liquid crystal display device can over the entire face, substantially uniformly reduce the blue light included in the rays of light emitted from the front face side of the light diffusion sheet.

It is to be noted that the "front face side" as referred to herein means the observer side when incorporated in the liquid crystal display device, whereas the "back face side" as referred to means the opposite side of the front face side.

Effects of the Invention

As explained in the foregoing, the light diffusion sheet and the backlight unit for a liquid crystal display device according to the aspects of the present invention can suitably inhibit emission of blue light.

DESCRIPTION OF THE PREFERRED EMBODIMENTS

Hereinafter, embodiments of the present invention will be explained in detail with appropriate references to accompanying Figures.

First Embodiment

Light Diffusion Sheet

Figure 1:
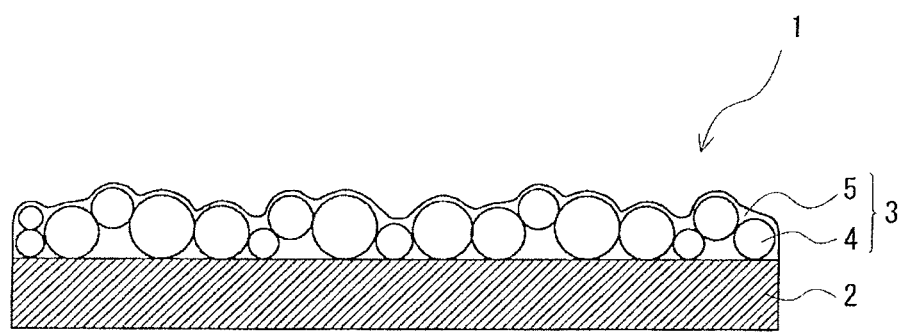
FIG. 1 shows a schematic cross sectional view illustrating a light diffusion sheet according an embodiment of the present invention.

A light diffusion sheet 1 shown in FIG. 1 includes a substrate layer 2, and a light diffusion layer 3 overlaid on the front face side of the substrate layer 2. The light diffusion sheet 1 is formed as a two-layer structure having the substrate layer 2 and the light diffusion layer 3.

Substrate Layer

The substrate layer 2 is formed from a transparent synthetic resin, as a principal component, that is capable of transmitting rays of light. The term "transparent" as referred to herein may encompass "colored and transparent", and "translucent", but particular preference is given to being "colorless and transparent" in order to attain a greater light transmittance. Examples of the synthetic resin used in the substrate layer 2 include polyethylene terephthalate, polyethylene naphthalate, acrylic resins, polycarbonates, polystyrene, polyolefins, cellulose acetate, weather resistance vinyl chloride, and the like but not particularly limited thereto. Among these, polyethylene terephthalate having excellent transparency and high strength are preferred, and polyethylene terephthalate resins with improved deflection performance are particularly preferred.

The lower limit of the average thickness of the substrate layer 2 is preferably 10 μm, more preferably 35 μm, and still more preferably 50 μm. On the other hand, the upper limit of the average thickness of the substrate layer 2 is preferably 500 μm, more preferably 250 μm, and still more preferably 188 μm. When the average thickness of the substrate layer 2 is less than the lower limit, curling may occur when coating a material for forming the light diffusion layer 3. In contrast, when the average thickness of the substrate layer 2 is greater than the above-described upper limit, the luminance of the liquid crystal display device may be lowered, and the thickness of the backlight unit may become so large, contrary to a requirement of reduction in the thickness of the liquid crystal display devices.

Light Diffusion Layer

The light diffusion layer 3 includes a light diffusing agent 4, and a binder 5 covering the light-diffusing agent 4. Due to including the light-diffusing agent 4, the light diffusion layer 3 enables rays of light to be uniformly diffused which transmit through the light diffusion layer 3 from the back side to the front side. In addition, the light-diffusing agent 4 leads to substantially uniform formation of fine concavity and convexity on the front face of the light diffusion layer 3. The light diffusion sheet 1 can more favorably diffuse the rays of light owing to a lens-like refracting action of the fine concavity and convexity formed on the front face thereof. In addition, the light diffusion layer 3 includes a blue light attenuation component that attenuates blue light. Although the average thickness of the light diffusion layer 3 is not particularly limited, for example, the average thickness is about no less than 1 μm and no greater than 30 μm.

As the light-diffusing agent 4, resin beads are used. The beads used as the light-diffusing agent 4 are substantially spherical transparent resin particles having a property of diffusing rays of light. As a material for forming the beads, for example, an acrylic resin, an acrylonitrile resin, a urethane resin, a vinyl chloride resin, a styrene resin, a polyester resin such as polyethylene terephthalate, a polyamide resin, an olefin resin such as a cycloolefin resin, or the like may be used. Of these, highly transparent acrylic resins are preferred, and polymethyl methacrylate (PMMA) is particularly preferred.

The lower limit of the mean particle size of the light-diffusing agent 4 is preferably 1 μm, more preferably 2 μm, and still more preferably 5 μm. On the other hand, the upper limit of the mean particle size of the light-diffusing agent 4 is preferably 50 μm, more preferably 20 μm, and still more preferably 15 μm. When the mean particle size of the light-diffusing agent 4 is less than the lower limit, the concavity and convexity formed on the front face of the light diffusion layer 3 by means of the light-diffusing agent 4 becomes so small that light diffusibility needed as the light diffusion sheet 1 may not be attained. To the contrary, when the mean particle size of the light-diffusing agent 4 is greater than the upper limit, the thickness of the light diffusion sheet 1 increases, and uniform diffusion may be difficult. It is to be noted that the "mean particle size" as referred to herein means an average of the particle size of 30 particles randomly extracted from the particles observed on an electron microscope with a magnification of ×1000, and the particle size is defined in terms of a Feret diameter (i.e., a distance between two parallel planes restricting the projections of the particles perpendicular to a specified direction).

The light-diffusing agent 4 includes as the blue light attenuation component, a yellow fluorescent material that generates yellow light through excitation by the blue light. The yellow fluorescent material generates yellow light through converting the wavelength of the blue light (380 nm to 500 nm) into a longer wavelength (550 nm to 610 nm). The light-diffusing agent 4 directly transmits a part of incident light (blue light as is), and an action of converting the wavelength by the yellow fluorescent material allows a part of the light to be converted into yellow light and to be transmitted. The yellow fluorescent material included in the light-diffusing agent 4 is exemplified by a YAG fluorescent material (yttrium-aluminum-garnet fluorescent material). Also, as the yellow fluorescent material, the YAG fluorescent material in which a part or all of yttrium is substituted with La or Lu may be used, or the YAG fluorescent material in which a part or all of aluminum is substituted with In or Sc may be used.

The lower limit of the content of the yellow fluorescent material in the light diffusion layer 3 is preferably 0.001% by mass, more preferably 0.005% by mass, still more preferably 0.01% by mass, and particularly preferably 0.05% by mass. On the other hand, the upper limit of the content of the yellow fluorescent material the light diffusion layer 3 is preferably 0.5% by mass, more preferably 0.4% by mass, still more preferably 0.2% by mass, and particularly preferably 0.1% by mass. When the content of the yellow fluorescent material in the light diffusion layer 3 is less than the lower limit described above, the attenuation effect of the blue light may not be sufficiently exhibited. To the contrary, when the content of the yellow fluorescent material in the light diffusion layer 3 is greater than the upper limit described above, the yellow light is enhanced, whereby color heterogeneity is more likely to be caused, and it may be difficult to adjust the chromaticity.

The lower limit of the content of the light-diffusing agent 4 with respect to 100 parts by mass of the resin component(s) in the binder 5 is preferably 10 parts by mass, more preferably 20 parts by mass, and still more preferably 50 parts by mass. On the other band, the upper limit of the content of the light-diffusing agent 4 with respect to 100 parts by mass of the resin component(s) in the binder 5 is preferably 500 parts by mass, more preferably 300 parts by mass, and still more preferably 200 parts by mass. When the content of the light-diffusing agent 4 is less than the lower limit described above, the light diffusibility may be insufficient, whereby color heterogeneity may be caused in regard to the rays of light emitted from the front face side. To the contrary, when the content of the light-diffusing agent 4 is greater than the upper limit described above, an effect of fixing the light-diffusing agent 4 by way of the binder 5 is deteriorated. It is to be noted that in a case where the light diffusion sheet is used as a light diffusion sheet for use at the top, which may be generally referred to, and which is to be disposed on the front face side of the prism sheet, superior light diffusibility as required for bottom diffusion sheets is not needed. Therefore, the lower limit of the content of the light-diffusing agent 4 in a case where the light diffusion sheet 1 is used as a top diffusion sheet is not particularly limited, but is preferably 10 parts by mass, and more preferably 20 parts by mass. In addition, the upper limit of the content of the light-diffusing agent 4 in a case where the light diffusion sheet 1 is used as the light diffusion sheet for use at the top is not particularly limited, but is preferably 40 parts by mass, and more preferably 30 parts by mass.

The binder 5 is prepared by curing (through crosslinking, etc.) a polymer composition containing a base polymer. The binder 5 allows the light-diffusing agent 4 to be arranged and fixed with a substantially uniform density on the entire surface of the substrate layer 2.

The base polymer is not particularly limited, and examples thereof include acrylic resins, polyurethane resins, polyester resins, fluorocarbon resins, silicone resins, polyamideimide, epoxy resins, ultraviolet ray-curable resins, and the like. These polymers may be used alone or as a mixture of two types thereof. In particular, the base polymer is preferably a polyol that is superior in processability, and capable of readily providing the light diffusion sheet 1 by means of e.g., coating, etc. In addition, the base polymer per se used in the binder 5 is preferably transparent, and is particularly preferably colorless transparent, in light of enhancement of transitivity of the rays of light.

Examples of the polyol include polyols obtained by polymerizing monomer component(s) that include(s) a hydroxyl group-containing unsaturated monomer, polyester polyols obtained under conditions involving hydroxyl groups in excess, and the like, which may be used either alone or as a mixture of two type or more thereof.

Examples of the hydroxyl group-containing unsaturated monomer include:

(a) hydroxyl group-containing unsaturated monomers such as 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol and crotonyl alcohol;

(b) hydroxyl group-containing unsaturated monomers prepared by a reaction of, for example, a divalent alcohol or an epoxy compound such as ethylene glycol, ethylene oxide, propylene glycol, propylene oxide, butylene glycol, butylene oxide, 1,4-bis(hydroxymethyl)cyclohexane, phenyl glycidyl ether, glycidyl decanoate or PLACCEL™ FM-1 (manufactured by Daicel Chemical Industries, Ltd.) with, for example, an unsaturated carboxylic acid such as acrylic acid, methacrylic acid, maleic acid, fumaric acid, crotonic acid or itaconic acid; and the like. The polyol may be produced by polymerizing one, or two or more selected from these hydroxyl group-containing unsaturated monomers.

Furthermore, the polyol may be produced by polymerizing one, or two or more types of ethylenic unsaturated monomer selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, text-butyl methacrylate, ethylhexyl methacrylate, glycidyl methacrylate, cyclohexyl methacrylate, styrene, vinyltoluene, 1-methylstyrene, acrylic acid, methacrylic: acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetoneacrylamide, ethylene, propylene, isoprene and the like, with the hydroxyl group-containing unsaturated monomer selected from the monomers listed in (a) and (b) above.

The number average molecular weight of the polyol obtained by polymerizing monomer components including the hydroxyl group-containing unsaturated monomer is no less than 1,000 and no greater than 500,000, and preferably no less than 5,000 and no greater than 100,000. In addition, the hydroxyl value is no less than 5 and no greater than 300, preferably no less than 10 and no greater than 200, and still more preferably no less than 20 and no greater than 150.

The polyester polyol obtained under conditions involving hydroxyl groups in excess may be produced by reacting:

(c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol. A, bis(hydroxymethyl)cyclohexane, hydroquinone bis(hydroxyethyl ether), tris(hydroxyethyl) isocyanurate or xylylene glycol, with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which the number of hydroxyl groups derived from the polyhydric alcohol such as propanediol, hexanediol, polyethylene glycol and trimethylolpropane is greater than the number of carboxyl groups derived from the polybasic acid.

The number average molecular weigh of such polyester polyols obtained under conditions involving hydroxyl groups in excess is no less than 500 and no greater than 300,000, and preferably no less than 2,000 and no greater than 100,000. In addition, the hydroxyl value thereof is no less than 5 and no greater than 300, preferably no less than 10 and no greater than 200, and more preferably no less than 20 and no greater than 150.

The polyol used as the base polymer of the polymer composition is preferably the polyester polyol, and an acryl polyol which is obtained by polymerizing a monomer component including the aforementioned hydroxyl group-containing unsaturated monomer, and which has a (meth)acryl unit or the like. The hinder 5 containing the polyester polyol or the acryl polyol as a base polymer is superior in weather resistance, and yellowing and the like of the light diffusion sheet 1 can be inhibited. It is to be noted that either one, or both of the polyester polyol and the acryl polyol may be used.

It is to be noted that the number of hydroxyl groups included in the polyester polyol and the acryl polyol is not particularly limited as long as the number is no less than two per molecule; however, when the hydroxyl value in the solid content is no greater than 10, the number of crosslinking points decreases, whereby physical properties of the coating film such as solvent resistance, water resistance, heat resistance and surface hardness tend to be inferior.

The binder 5 preferably includes a light absorbing agent that allows visible light other than the blue light to be attenuated, in particular, according to the embodiment of the present invention, yellow light emitted from the light diffusion layer 3 tends to be enhanced due to the light-diffusing agent 4 including the yellow fluorescent material. Therefore, it is preferred that the binder includes the light absorbing agent that absorbs yellow light. It is to be noted that the light absorbing agent included in the binder 5 may be appropriately selected in accordance with alteration of chromaticity resulting from the blue light attenuation component, and is exemplified, by the aforementioned light absorbing agents that absorb yellow light, as well as red light-absorbing agents, infrared ray absorbing, agents, and the like. Examples of the light absorbing agent that absorbs yellow light include blue dyes and pigments such as xanthene-based, phthalocyanine-based, triphenylmethane-based, azo-based, quinone-based and polymethine-based blue dyes and pigments. In addition, examples of the red light-absorbing agent include green dyes and pigments such as phthalocyanine-based, azulenium-based, triphenylmethane-based, quinone-based, polymethine-based and squalium-based green dyes and pigments. Furthermore, examples of the infrared ray-absorbing agent include dyes and pigments such as cyanine-based, squalium-based, methine-based, naphthoquinone-based, quinoneimine-based, phthalocyanine-based and tetradehydrocholine-based dyes and pigments.

The lower limit of the content of the light absorbing agent that allows visible light other than the blue light to be attenuated, in the light diffusion, layer 3 is preferably 0.001% by mass, more preferably 0.005% by mass, still more preferably 0.01% by mass, and particularly preferably 0.05% by mass. On the other hand, the upper limit of the content of the light absorbing agent that allows visible light other than the blue light to be attenuated in the light diffusion layer 3 is preferably 0.5% by mass, more preferably 0.4% by mass, still more preferably 0.2% by mass, and particularly preferably 0.1% by mass. When the content of the light absorbing agent that allows visible light other than the blue light to be attenuated in the light diffusion layer 3 is less than the lower limit described above, the effect of adjusting the chromaticity of the rays of light emitted from the light diffusion layer 3 may not be sufficiently achieved. To the contrary, when the content of the light absorbing agent that allows visible light other than the blue light to be attenuated in the light diffusion layer 3 is greater than the upper limit described above, light having a specific color may be attenuated, and light transmittance may be decreased, contrary to demands for an increase in the luminance.

In addition, the content of the light absorbing agent that allows visible light other than the blue light to be attenuated in the light diffusion layer 3 is preferably adjusted depending on the content of the yellow fluorescent material in the light diffusion layer 3. Specifically, the content of the light absorbing agent that allows visible light other than the blue light to be attenuated in the light diffusion layer 3 is preferably no greater than the content of the yellow fluorescent material in the light diffusion layer 3. In the light diffusion sheet 1, due to the content of the light absorbing agent that allows visible light other than the blue light to be attenuated in the light diffusion layer 3 being no greater than the content of the yellow fluorescent material, an increase in the luminance can be facilitated while suitably adjusting the chromaticity.

In addition, it is to be noted that the polymer composition for preparing the binder 5 may further contain, for example, a fine inorganic filler, a curing agent, a plasticizer, a dispersant, any of various types of levelling agents, an antistatic agent, an ultraviolet ray-absorbing agent, a viscosity modifying agent, an anti-oxidant, a lubricant, a light stabilizing agent, and the like, ad libitum.

A ratio of the refractive index of the binder 5 to the refractive index of the light-diffusing agent 4 is not particularly limited, but it is preferred that the refractive index of the light-diffusing agent 4 is greater than the refractive index of the binder 5. When the refractive index of the light-diffusing agent 4 is greater than the refractive index of the binder 5, rays of light that enter from the binder 5 into the light-diffusing agent 4 can be prevented from total reflection at the boundary between the binder 5 and the light-diffusing agent 4. Therefore, such a configuration enables the blue light entered into the light diffusion layer 3 to be efficiently attenuated by the yellow fluorescent material included in the light-diffusing agent 4.

Production Method

A production method of the light diffusion sheet 1 includes steps of: forming a sheet element composing the substrate layer 2; and overlaying a light diffusion layer 3 on the front face of the sheet element.

Although the step of forming the sheet element composing the substrate layer 2 is not particularly limited, for example, a process of forming the sheet element may be exemplified which includes subjecting a molten thermoplastic resin to extrusion molding using a T die, and subsequently drawing the extrusion-molded article in both a layer longitudinal direction and a layer width direction. Well-known extrusion molding methods employing the T die may include, for example, a polishing roll method and a chill roll method. In addition, drawing processing of the sheet element may be also exemplified by a biaxial drawing process for tubular films, a biaxial drawing process for flat films, and the like.

The step of overlaying the light diffusion layer on the front face of the sheet element composing the substrate layer 2 may involve a method including applying a coating liquid containing the light-diffusing agent 4 and the binder 5 on the front face of the sheet element, followed by drying.

Advantages

Since the ht diffusion sheet 1 has a blue light attenuation component, emission of the blue light can be inhibited. In addition, since a light-diffusing agent 4 and a binder 5 covering the light-diffusing agent 4 are included in the light diffusion layer 3 of the light diffusion sheet 1, light diffusion layer 3 enables rays of light to be substantially uniformly diffused. Therefore, the light, diffusion sheet 1 can over the entire face, substantially uniformly decrease the blue light included in the rays of light emitted from the front face side.

Since the light diffusion layer 3 has both the light diffusion function and a blue light attenuation function in the light diffusion sheet 1, blue light included in the rays of light emitted from the front face side can be suitably and substantially uniformly reduced over the entire face, and in turn occurrence of color heterogeneity in the face can be effectively inhibited. More specifically, the rays of light emitted from the light source of the backlight are not necessarily substantially uniformly entered into the back face of the light diffusion sheet 1 as the case may be, and in a possible instance presumed, for example, the quantity of incident light in the vicinity of the light source may be comparatively greater than the quantity of incident light at a position away from the light source. In this regard, according to the light diffusion sheet 1, the light diffusion layer 3 contains the light-diffusing agent 4 and the binder 5, and has superior light diffusibility; therefore, rays of light entered into the light diffusion layer 3 are suitably diffused and refracted at the light diffusion layer 3, and then substantially uniformly emitted from the front face side. Additionally, since the blue light attenuation component is included in the light diffusion layer 3 thus having a function of substantially uniformly emitting the incident light in the light diffusion sheet 1, blue light of the rays of light emitted from the light diffusion layer 3 is substantially uniformly attenuated over the entire face.

In addition, the rays of light emitted, from the light source of the backlight are emitted to the front face side while being reflected on various types of optical sheets and between each of the layers of various types of optical sheet, in general. In this respect, rays of light after emission from the front face side of the member capable of substantially uniformly emitting the rays of light such as the light diffusion sheet 1 are substantially uniformly transmitted over the entire area, and substantially uniformly reflected. Therefore, since the light diffusion layer 3 composing the emission face side with respect to the rays of light includes the blue light attenuation component in the light diffusion sheet 1, rays of light emitted from a specific area are reflected to the side of the light diffusion layer 3 comparatively many times, and transmitted through the light diffusion layer 3 a plurality of times, whereby an attenuation percentage of the blue light, in this area becomes grater than that in other area, and in turn possible occurrence of lack in uniformity of the luminance can be prevented. Furthermore, since the blue light attenuation component included in the light diffusion layer 3 enables emission of the blue light to be inhibited according to the light diffusion sheet 1, necessity of separately providing other member, layer, etc., for inhibiting the emission of the blue light, is obviated, thereby enabling reduction in thickness of the liquid crystal display device to be facilitated.

Due to the blue light attenuation component being a yellow fluorescent material that generates yellow light through excitation by the blue light, the light diffusion sheet 1 enables emission of the blue light to be suitably inhibited.

In the light diffusion sheet 1, the light-diffusing agent 4 is resin beads, and the blue light attenuation component is include in the resin beads; therefore, while attenuating a part of the blue light entered into the beads, remaining blue light can be substantially uniformly diffused and emitted from the front face side. Therefore, the light diffusion sheet 1 enables the blue light emitted from the front face side to be substantially uniformly attenuated, and alteration of chromaticity can be accurately prevented.

Since the binder 5 includes a light absorbing agent that allows visible light other than the blue light to be attenuated in the light diffusion sheet 1, visible light other than the blue light can be substantially uniformly reduced over the entire face, whereby alteration of chromaticity resulting from attenuation of the blue light can be suitably inhibited, in addition, due to the light diffusion layer 3 containing a light absorbing agent that allows visible light other than the blue light to be attenuated, the light diffusion sheet 1 can prevent an increase in the number of components, thereby enabling reduction in thickness of the liquid crystal display device to be facilitated.

Moreover, in particular, since the light diffusing agent 4 includes a yellow fluorescent material, and the binder 5 includes a light absorbing agent that absorbs yellow light, the light diffusion sheet 1 enables yellow light radiated by the yellow fluorescent material to be suitably absorbed by the light absorbing agent included in the binder 5 covering the light-diffusing agent 4. Therefore, the light diffusion sheet 1 allows a part of the blue light to be suitably attenuated, and enables alteration of chromaticity and a decrease of the luminance to be effectively prevented.

Backlight Unit

Figure 5:
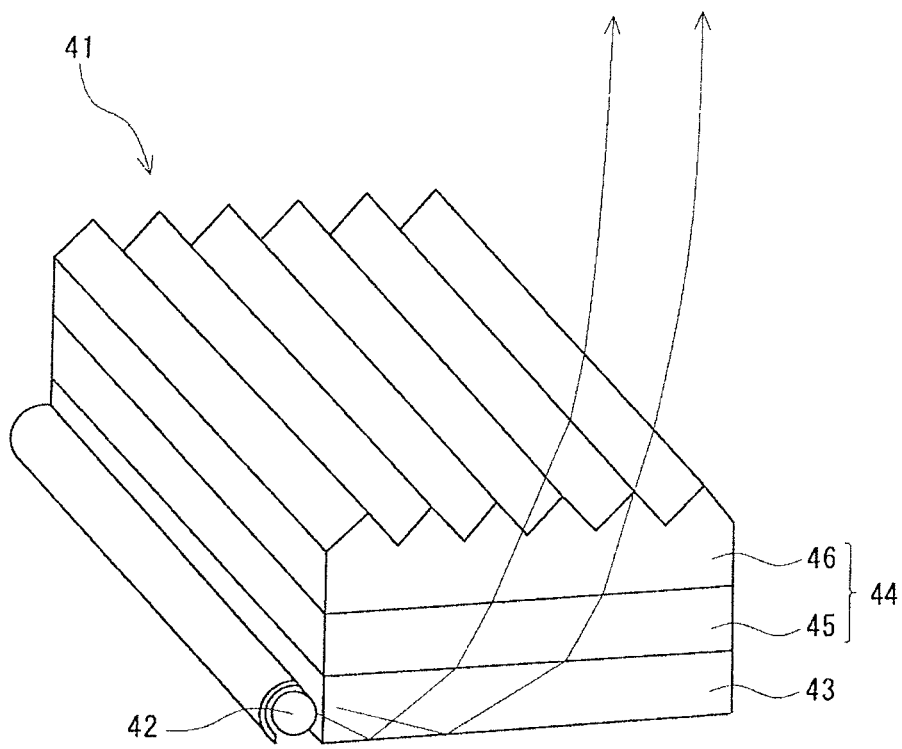
FIG. 5 shows a schematic perspective view illustrating a common edge lit backlight unit.

The light diffusion sheet 1 is used in a backlight unit for a liquid crystal display device that allows rays of light radiated from a lamp to be dispersed and leads the rays to the front face side (see, for example, FIG. 5). Specifically, the backlight unit for a liquid crystal display device includes: an optical waveguide plate; a light source that illuminates the end face of the optical waveguide plate with rays of light; the light diffusion sheet provided by overlaying on the front face of the optical waveguide plate; and an optical sheet such as a prism sheet or a micro lens sheet provided by overlaying on the front face side of the light diffusion sheet 1.

Advantages

Since the backlight unit for a liquid crystal display device has the blue light attenuation component in the light diffusion sheet 1, emission of the blue light can be inhibited. Moreover, in the backlight unit for a liquid crystal display device, the light diffusion layer 3 of the light diffusion sheet 1 includes the light-diffusing agent 4 and the binder 5 covering the light-diffusing agent 4; therefore, rays of light can be substantially uniformly diffused by the light diffusion layer 3. Therefore, the backlight unit for a liquid crystal display device enables blue light included in the rays of light emitted from the front face side of the light diffusion sheet 1 to be substantially uniformly reduced over the entire face. Due to the blue light attenuation component included in the light diffusion layer 3 of the light diffusion sheet 1, the backlight unit for a liquid crystal display device enables emission of the blue light, to be inhibited; therefore, necessity of providing other member, layer, etc., for inhibiting the emission of the blue light is obviated, thereby enabling reduction in thickness of the liquid crystal display device to be facilitated.

Second Embodiment

Light Diffusion Sheet

Figure 2:
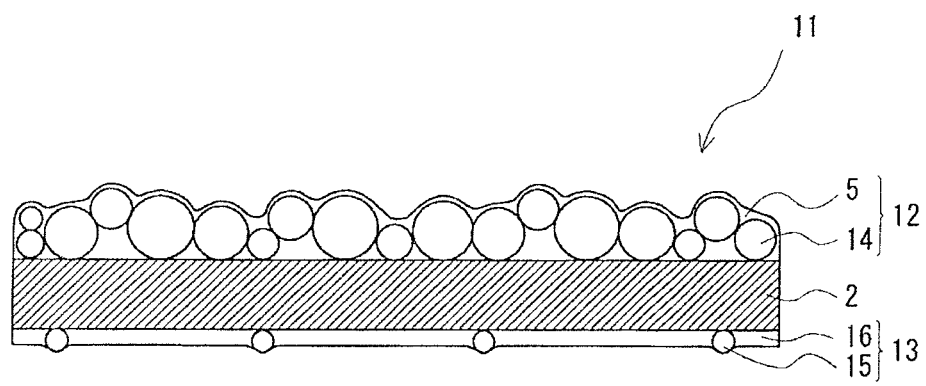
FIG. 2 shows a schematic cross sectional view illustrating a light diffusion sheet according to an embodiment distinct from the light diffusion sheet shown in FIG. 1.

A light diffusion sheet 11 shown in FIG. 2 includes a substrate layer 2, a light diffusion layer 12 overlaid on the front face side of the substrate layer 2, and a sticking preventive layer 13 overlaid on the back face side of the substrate layer 2. The light diffusion sheet 11 is formed as a three-layer structure having the substrate layer 2, the light diffusion layer 12 and the sticking preventive layer 13. The light diffusion sheet 11 is provided in the backlight unit for a liquid crystal display device in place of the light diffusion sheet 1 shown in FIG. 1. Since the substrate layer 2 is similar to that in the light diffusion sheet 1 shown in FIG. 1, the explanation thereof is omitted through referring to the identical reference symbol.

Light Diffusion Layer

The light diffusion layer 12 includes a light diffusing agent 14, and a binder 5 covering the light diffusing agent 14. Due to Including the light-diffusing agent 14, the light diffusion layer 12 enables rays of light to be uniformly diffused which transmit through the light diffusion layer 12 from the back side to the front side. In addition, the light-diffusing agent 14 leads to substantially uniform formation of fine concavity and convexity on the front face of the light diffusion layer 12. Thus, the light diffusion sheet 11 can more favorably diffuse the rays of light owing to a lens-like refracting action of the fine concavity and convexity formed on the front face thereof. The light diffusion layer 12 includes a blue light attenuation component that attenuates blue light. It is to be noted that since the binder 5 is similar to that in the light diffusion sheet 1 shown in FIG. 1, the explanation thereof is omitted through referring to the identical reference symbol. In addition, the average thickness of the light diffusion layer 12 is similar to that of the light diffusion layer 3 shown in FIG. 1.

As the light-diffusing agent 14, resin beads are used. The beads used, as the light-diffusing agent 14 are substantially spherical transparent resin particles having a property of diffusing rays of light. A material for forming the beads is similar to the material for forming the light-diffusing agent 4 shown in FIG. 1. In addition, the mean particle size and the content of the light-diffusing agent 14 are also similar to those of the light-diffusing agent 4 shown in FIG. 1.

The light-diffusing agent 14 includes a light absorbing agent that absorbs the blue light as the blue light attenuation component. Examples of such a blue light-absorbing agent include an indigo-based dye, a quinophthalone-based dye, a quinone-based dye, a coumarin-based dye, a chlorophyll-based dye, a diphenylmethane-based dye, a spiropyran-based dye, a thiazine-based dye, a triphenylmethane-based dye, and the like.

The lower limit of the content of the light absorbing agent that absorbs the blue light in the light diffusion layer 12 is preferably 0.001% by mass, more preferably 0.005% by mass, still more preferably 0.01% by mass, and particularly preferably 0.05% by mass. On the other hand, the upper limit of the content of the light absorbing agent that absorbs the blue light in the light diffusion layer 12 is preferably 0.5% by mass, more preferably 0.4% by mass, still more preferably 0.2% by mass, and particularly preferably 0.1% by mass. When the content of the light absorbing agent that absorbs the blue light in the light diffusion layer 12 is less than the lower limit described above, the effect of attenuating the blue light may not be sufficiently achieved. To the contrary, when the content of the light absorbing agent that absorbs the blue light in the light diffusion layer 12 is greater than the upper limit described above, color heterogeneity is more likely to be caused, and it may be difficult to adjust the chromaticity.

A ratio of the refractive index of the binder 5 to the refractive index of the light-diffusing agent 14 is similar to that in, the light diffusion sheet 1 shown in FIG. 1.

Sticking Preventive Layer

The sticking preventive layer 13 is provided by dispersing beads 15 in a binder 16. In the sticking preventive layer 13, the beads 15 are scatteringly arranged on the back face of the substrate layer 2. Due to the beads scatteringly arranged, the sticking preventive layer 13 has a plurality of protruding sections formed resulting from the beads 15, and flat sections where the beads 15 are absent. At a plurality of protruding sections, the sticking preventive layer 13 is brought into contact with the official waveguide plate as well as other optical sheet, etc., disposed on the back face side, whereby sticking is prevented by inhibiting abutting on the entire back face, and thus lack in uniformity of the luminance of the liquid crystal display device can be inhibited.

The material for forming the beads 15 is exemplified by similar materials for forming the beads used as the light-diffusing agent 4 of the light diffusion layer 3 shown in FIG. 1. In addition, the binder 15 is prepared by curing (through crosslinking, etc.) a polymer composition containing a base polymer similar to that for the binder 5 in the light diffusion layer 3 shown in FIG. 1. Although the average thickness of the sticking preventive layer 13 (average thickness of the binder 16 portion in the section where the beads 15 are absent) is not particularly limited, the average thickness may be, for example, about no less than 1 μm and no greater than 10 μm.

Production Method

A production method of the light diffusion sheet 11 includes steps of forming a sheet element composing the substrate layer 2; overlaying a light diffusion layer 12 on the front face of the sheet element; and overlaying a sticking preventive layer 13 on the back face of the sheet element.

The step of forming the sheet element composing the substrate layer 2, and the step of overlaying the light diffusion layer 12 on the front face of the sheet element may be carried out by a similar process for the production method of the light diffusion sheet 1 shown in FIG. 1.

Although the step of overlaying the sticking preventive layer 13 on the back face of the sheet element is not particularly limited, this step may include, for example; (a) a step of preparing a coating liquid for a sticking preventive layer by mixing beads 15 in a polymer composition constituting the binder 16; and (b) a step of overlaying the sticking preventive layer by applying the coating liquid for a sticking preventive layer on the back face of the sheet element, followed by drying.

Advantages

According to the light diffusion sheet 11, due to the light absorbing agent that absorbs the blue light used as the blue light attenuation component, emission of the blue light can be suitably inhibited.

Since the light diffusion sheet 11 includes on the back face side of the substrate layer 2, the sticking preventive layer 13 in which the beads 15 are dispersed in the binder 16, sticking of the light diffusion sheet 11 with the optical waveguide plate and other optical sheet provided on the back face side can be prevented.

Third Embodiment

Light Diffusion Sheet

Figure 3:
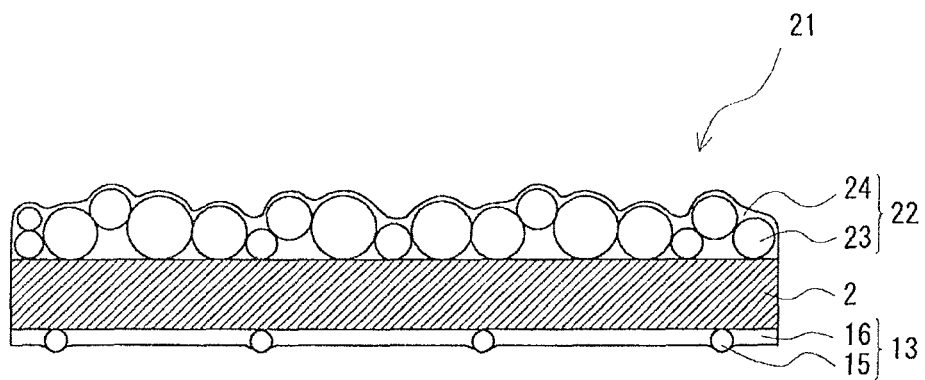
FIG. 3 shows a schematic cross sectional view illustrating a light diffusion sheet according to an embodiment distinct from the light diffusion sheet shown in FIG. 1 and FIG. 2.

A light diffusion sheet 21 shown in FIG. 3 includes a substrate layer 2, a light diffusion layer 22 overlaid on the front face side of the substrate layer 2, and a sticking preventive layer 13 overlaid on the back face side of the substrate layer 2. The light diffusion sheet 21 is formed as a three-layer structure having the substrate layer 2, the light diffusion layer 22 and the sticking preventive layer 13. The light diffusion sheet 21 is provided in the backlight unit for a liquid crystal display device in place of the light diffusion sheet 1 shown in FIG. 1, or the light diffusion sheet 11 shown in FIG. 2. Since the substrate layer 2 and the sticking preventive layer 13 are similar to those in the light diffusion sheet 11 shown in FIG. 2, the explanations thereof are omitted through referring to the identical reference symbol.

Light Diffusion Layer

The light diffusion layer 22 includes a light-diffusing agent 23, and a binder 24 covering the light diffusing agent 23. Due to including the light-diffusing agent 23, the light diffusion layer 22 enables rays of light to be substantially uniformly diffused which transmit through the light diffusion layer 22 from the back face to the front face. In addition, the light-diffusing agent 23 leads to substantially uniform formation of fine concavity and convexity on the front face of the light diffusion layer 22. Thus, the light diffusion sheet 21 can more favorably diffuse the rays of light owing to a lens-like refracting action of the fine concavity and convexity formed on the front face thereof. The light diffusion layer 22 includes a blue light attenuation component that attenuates blue light. It is to be noted that the average thickness of the light diffusion layer 22 is similar to that of the light diffusion layer 3 shown in FIG. 1.

The light-diffusing agent 23 is particles having a property of diffusing rays of light, and is classified roughly into an inorganic filler and an organic filler. Specific examples of the inorganic filler include silica, aluminum hydroxide, aluminum oxide, zinc oxide, barium sulfide, magnesium silicate, and mixtures thereof. Specific materials for the organic filler include acrylic resins, acrylonitrile resins, polyurethane, polyvinyl chloride, polystyrene, polyacrylonitrile, polyamide, and the like. Of these, highly transparent acrylic resins are preferred, and polymethyl methacrylate (PMMA) is particularly preferred.

The shape of the light-diffusing agent 23 is not particularly limited, and may be exemplified by spherical, cubic, needle-like, rod-like, spindle shape, platy, flaky, fibrous shapes, and the like. Of these, spherical beads that are superior in light diffusibility are preferred.

The mean particle size and the content of the light-diffusing agent 23 are similar to those of the light-diffusing agent 4 shown in FIG. 1.

The binder 24 is prepared by curing (through crosslinking, etc.) a polymer composition containing a base polymer. The binder 24 allows the light-diffusing agent 23 to be arranged and fixed with a substantially uniform density on the entire surface of the substrate layer 2. Exemplary base polymers for preparing the binder 24 are similar to those for the base polymer of the binder 5 shown in FIG. 1.

The binder 24 includes as the blue light attenuation component, a yellow fluorescent material that generates yellow light through excitation by the blue light, or a light absorbing agent that absorbs the blue light.

The yellow fluorescent material generates yellow light through converting the wavelength of the blue light (380 nm to 500 nm) into a longer wavelength (550 nm to 610 nm).

The binder 24 directly transmits a part of incident light (blue light as is), and an action of converting the wavelength by the yellow fluorescent material allows a part of the light to be converted into yellow light and to be transmitted. Exemplary yellow fluorescent material included in the binder 24 is similar to the yellow fluorescent material which may be included in the light-diffusing agent 4 shown in FIG. 1. The content of the yellow fluorescent material in the light diffusion layer 22 is similar to the content of the yellow fluorescent material in the light diffusion layer 3 shown in FIG. 1. In addition, exemplary light absorbing agent that absorbs the blue light is similar to the light absorbing agent which may be included in the light-diffusing agent 14 shown in FIG. 2. The content of the light absorbing agent that absorbs the blue light, in the light diffusion layer 22 is similar to the content, of the light absorbing agent that absorbs the blue light, in the light diffusion layer 12 shown in FIG. 2.

In addition, the binder 24 may also include a light absorbing agent that allows visible light other than the blue light to be attenuated. The light absorbing agent that allows visible light other than the blue light to be attenuated which may be included in the binder 24 is similar to the light, absorbing agent which may be included in the binder 5 shown in FIG. 1. The content of the light absorbing agent that allows visible light other than the blue light to be attenuated in the light diffusion layer 22 is similar to the content of the light absorbing agent that allows visible light other than the blue light to be attenuated in the light diffusion layer 3 shown in FIG. 1.

It is to be noted that the polymer composition for preparing the binder 24 may further contain, for example, a fine inorganic filler, a curing agent, a plasticizer, a dispersant, any of various types of levelling agents, an antistatic agent, an ultraviolet ray-absorbing agent, an anti-oxidizing agent, a viscosity modifying agent, a lubricant, a light stabilizing agent, and the like, ad libitum.

Production Method

The light diffusion sheet 21 may be produced by way of similar steps to those in the production method of the light diffusion sheet 11 shown in FIG. 2.

Advantages

Since the blue light attenuation component is included in the binder 24 included in the light diffusion layer 22, the light diffusion sheet 21 enables emission of the blue light to be substantially uniformly inhibited over the entire face while substantially uniformly diffusing the rays of light emitted from the front face side.

Fourth Embodiment

Light Diffusion Sheet

Figure 4:
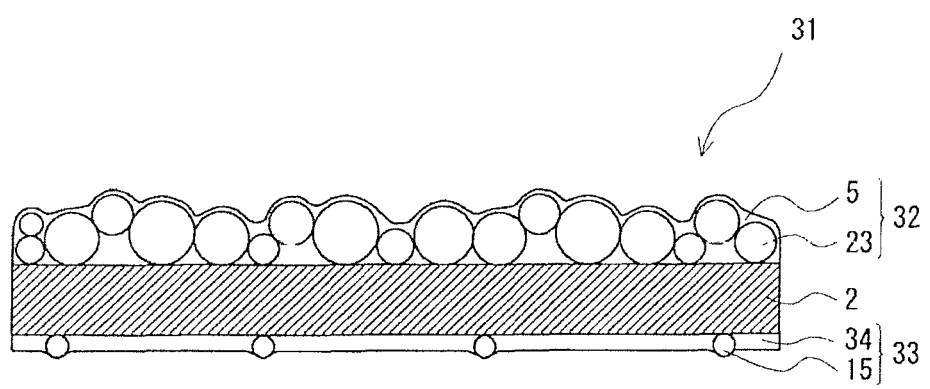
FIG. 4 shows a schematic cross sectional view illustrating a light diffusion sheet according to an embodiment distinct from the light diffusion sheet shown in FIG. 1, FIG. 2 and FIG. 3.

A light diffusion sheet 31 shown in FIG. 4 includes a substrate layer 2, a light diffusion layer 32 overlaid on the front face side of the substrate layer 2, and a sticking preventive layer 33 overlaid on the back face side of the substrate layer 2. The light diffusion sheet 31 is formed as a three-layer structure having the substrate layer 2, the light diffusion layer 32 and the sticking preventive layer 33. The light diffusion sheet 31 is used in a backlight unit for a liquid crystal display device that allows rays of light radiated from a lamp to be dispersed and leads the rays to the front face side (see, for example, FIG. 5). Specifically, the light diffusion sheet 31 is used in a backlight unit for a liquid crystal display device including: an optical waveguide plate; a light source that illuminates the end face of the optical waveguide plate with rays of light; a light diffusion sheet provided by overlaying on the front face of the optical waveguide plate; and a prism sheet provided by overlaying on the front face side of the light diffusion sheet, as a light diffusion sheet for use at the top, which is provided on the front face side of the prism sheet. Since the substrate layer 2 is similar to that in the light diffusion sheet 1 shown in FIG. 1, the explanation thereof is omitted through referring to the identical reference symbol.

Light Diffusion layer

The light diffusion layer 32 includes a light-diffusing agent 23, and a binder 5 covering the light-diffusing agent 23. Due to including the light-diffusing agent 23, the light diffusion layer 32 enables rays of light to be substantially uniformly diffused which transmit through the light diffusion layer 32 from the back face to the front face. In addition, the light-diffusing agent 23 leads to substantia uniform formation of fine concavity and convexity on the front face of the light diffusion layer 32. Thus, the light diffusion sheet 31 can more favorably diffuse the rays of light owing to a lens-like refracting action of the fine concavity and convexity formed on the front face thereof. It is to be noted that since the light-diffusing agent 23 is similar to that in the light diffusion sheet 21 shown in FIG. 3, and that the binder 5 is similar to that in the light diffusion sheet 1 shown in FIG. 1, the explanations thereof are omitted through referring to the identical reference symbol. In addition, the average thickness of the light diffusion layer 32 is similar to that of the light diffusion layer 3 shown in FIG. 1.

Sticking Preventive Layer

The sticking preventive layer 33 is provided by dispersing beads 15 in a binder 34. In the sticking preventive layer 33, the beads 15 are scatteringly arranged on the back face of the substrate layer 2. Due to the beads scatteringly arranged, the sticking preventive layer 33 has a plurality of protruding sections formed resulting from the beads 15, and flat sections where the beads 15 are absent. Since the beads 15 included in the sticking preventive layer 33 are similar to those in the light diffusion sheet 11 shown in FIG. 2, the explanation thereof is omitted through referring to the identical reference symbol. In addition, the average thickness of the sticking preventive layer 33 (average thickness of the binder 34 portion in the section where the beads 15 are absent) is similar to the average thickness of the sticking preventive layer 13 shown in FIG. 2.

The binder 34 is prepared by curing (through crosslinking, etc.) a polymer composition containing a base polymer similar to that for the binder 5 in the light diffusion layer 3 shown in FIG. 1. The binder 34 includes as a blue light absorbing component, a yellow fluorescent material that generates yellow light through excitation by the blue light, or a light absorbing agent that absorbs the blue light.

The yellow fluorescent material generates yellow light through converting the wavelength of the blue light (30 nm to 500 nm) into a longer wavelength (550 nm to 610 nm). The binder 34 directly transmits a part of incident light (blue light as is), and an action of converting the wavelength by the yellow fluorescent material allows a part of the light to be converted into yellow light and to be transmitted. Exemplary yellow fluorescent material included in the binder 34 is similar to the yellow fluorescent material which may be included in the light-diffusing agent 4 shown in FIG. 1. The content of the yellow fluorescent material in the sticking preventive layer 33 is similar to the content of the yellow fluorescent material in the light diffusion layer 3 shown in FIG. 1. In addition, exemplary light absorbing agent that absorbs the blue light is similar to the light absorbing agent which may be included in the light-diffusing agent 14 shown in FIG. 2. The content of the light absorbing agent that absorbs the blue light in the sticking preventive layer 33 is similar to the content of the light absorbing agent that absorbs the blue light in the light diffusion layer 12 shown in FIG. 2, Production Method The light diffusion sheet 31 may be produced by way of similar steps to those in the production method of the light diffusion sheet 11 shown in FIG. 2, Advantages In the light diffusion sheet 31, since the blue light attenuation component is included in the binder 34 in the sticking preventive layer 33, the sticking of the light diffusion sheet 31 with the lens sheet or the like provided on the back face side can be prevented, and also the blue light attenuation component is substantially uniformly dispersed along a planar direction of the sticking preventive layer 33, whereby the blue light can be substantially' uniformly reduced over the entire face. In other words, according to the light diffusion sheet 31, the sticking preventive layer 33 is formed to have an average thickness smaller than that of other layer(s) (the substrate layer 2 or the light diffusion layer 32). Thus, when a blue light attenuation component is included in the sticking preventive layer 33 formed to have such a small thickness, the blue light attenuation component can be readily dispersed along a planar direction of the sticking preventive layer 33. Moreover, since the content of the beads 15 in the sticking preventive layer 33 is comparatively low, blue light included in the rays of light that enter the back face side of the light diffusion sheet 31 is likely to be substantially uniformly reduced over the entire face, by means of the blue light attenuation component included to be dispersed in the binder 34. Additionally, necessity of separately providing other member, layer, etc., for inhibiting the emission of the blue light is obviated according to the light diffusion sheet 31, thereby enabling reduction in thickness of the liquid crystal display device to be facilitated.

Since the light diffusion sheet 31 is used as a light diffusion sheet for use at the top, blue light included in the rays of light, substantially uniformly entered from the back face side is substantially uniformly reduced over the entire face, and can be substantially uniformly emitted from the front face side. In particular, since the blue light attenuation component is substantially uniformly dispersed along the planar direction of the sticking preventive layer 33, the light diffusion sheet 31 enables the blue light included in the rays of light substantially uniformly entered from the back face side to be effectively and substantially uniformly reduced over the entire face, and also enables the rays of light including reduced blue light to be substantially uniformly emitted from the front face side, whereby occurrence of color heterogeneity in the face can be effectively inhibited, Other Embodiment It is to be noted that the light diffusion sheet and the backlight unit for a liquid crystal display device according to the embodiments of the present invention can be put into practice according to any embodiment subjected to a variety of alterations, improvements and the like, in addition to the embodiments described above. For example, the substrate layer may include the blue light attenuation component in the light diffusion sheet. According to the light diffusion sheet, even if composed in this manner, rays of light including reduced blue light can be substantially uniformly diffused in the light diffusion layer, and emitted from the front face side. In addition, according to such a configuration, necessity of separately providing other member, layer, etc., for inhibiting the emission of the blue light is obviated, thereby enabling reduction in thickness of the liquid crystal display device to be facilitated.

In the light diffusion sheet, it is also preferred that other layer provided on the front face side of the layer that includes the blue light attenuation component includes the light absorbing agent that allows visible light other than the blue light to be attenuated. Such a configuration is exemplified by:

(a) a configuration in which the sticking preventive layer includes the blue light attenuation component, and the substrate layer or the light diffusion layer includes the light absorbing agent that allows visible light other than the blue light to be attenuated, and (b) a configuration in which the substrate layer includes the blue light attenuation component, and the light diffusion layer includes the light absorbing agent that allows visible light other than the blue light to be attenuated. Furthermore, in a case where such a configuration is adopted, a yellow fluorescent material is preferably used as the blue light attenuation component. According to this configuration, alteration of chromaticity resulting from attenuation of the blue light is suitably inhibited by the light absorbing agent that allows visible Light other than the blue light to be attenuated, and a decrease in the luminance can be suppressed. At the same time, according to such a configuration, an increase in the number of components can be prevented, thereby enabling reduction in thickness of the liquid crystal display device to be facilitated.

The light diffusion sheet may also include the light absorbing agent that allows visible light other than the blue light to be attenuated, in the light-diffusing agent included in the light diffusion layer.

The light diffusion sheet has a two-layer structure having the substrate layer and, the light diffusion layer according to the first embodiment, whereas the light diffusion sheet has a three-layer structure having the substrate layer, the light diffusion layer and the sticking preventive layer according to the second embodiment, the third embodiment and the fourth embodiment. However, the light diffusion sheet may have other layer between the substrate layer and the light diffusion layer, or between the substrate layer and the sticking preventive layer. In addition, the front face or the back face of each layer in the light diffusion sheet may be subjected to a corona discharge treatment, an ozone treatment, a low-temperature plasma treatment, a glow discharge treatment, an oxidization treatment, a primer coating treatment, an undercoat treatment, an anchor coating treatment and/or the like. The light diffusion sheet may be composed through a combination, of the configurations according to each embodiment described above. For example, the light diffusion sheet may be used as a light diffusion sheet for use at the or even in a case where the blue light attenuation component is included in the light diffusion layer or the substrate layer, or may be used as a light diffusion sheet for use at the bottom even in a case where the blue light attenuation component is included in the sticking preventive layer.

INDUSTRIAL APPLICABILITY

As described in the foregoing, the light diffusion sheet and the backlight unit for a liquid crystal display device according to the embodiments of the present invention can suitably inhibit emission of blue light, and therefore, can be suitably used in a variety of liquid crystal display devices such as transmissive liquid crystal display devices.

EXPLANATION OF THE REFERENCE SYMBOLS 1 light diffusion sheet
2 substrate layer
3 light diffusion layer
4 light-diffusing agent
5 binder
11 light diffusion sheet
12 light diffusion layer
13 sticking preventive layer
14 light-diffusing agent
15 beads
16 binder
21 light diffusion sheet
22 light diffusion layer
23 light-diffusing agent
24 binder
31 light diffusion sheet
32 light diffusion layer
33 sticking preventive layer
34 binder
41 backlight unit
42 light source
43 optical waveguide plate
44 optical sheet
45 light diffusion sheet
46 prism sheet

What is claimed is:

1. A light diffusion sheet comprising:
a transparent substrate layer; and
a light diffusion layer overlaid on a front face side of the substrate layer,
the light diffusion layer being a light diffusion sheet for a backlight unit of a liquid crystal display device comprising a light-diffusing agent and a binder covering the light-diffusing agent, and
the light diffusion layer comprising a component that attenuates only blue light,
wherein
the component that attenuates the blue light is a yellow fluorescent material that generates only yellow light through excitation by the blue light,
the binder comprises a light absorbing agent that attenuates visible light other than the blue light, and
the light absorbing agent is configured to absorb yellow light emitted resulting from the component that attenuates blue light.

2. The light diffusion sheet according to claim 1, wherein the light-diffusing agent is resin beads, and the component that attenuates blue light is included in the resin beads.

3. The light diffusion sheet according to claim 1, wherein the component that attenuates blue light is included in the binder.

4. The light diffusion sheet according to claim 1, wherein the substrate layer comprises the component that attenuates blue light.

5. The light diffusion sheet according to claim 1, wherein a sticking preventive layer comprising beads dispersed in a binder is provided on a back face side of the substrate layer, and the component that attenuates blue light is included in the binder of the sticking preventive layer.

6. The light diffusion sheet according to claim 1, which is a light diffusion sheet for use at the top.

7. A backlight unit for a liquid crystal display device that allows rays of light radiated from a lamp to be dispersed and leads the rays to a front face side, the backlight unit for a liquid crystal display device comprising the light diffusion sheet according to claim 1.

8. The light diffusion sheet according to claim 1, wherein the light diffusion layer is 1 micrometer to 30 micrometers in thickness.

9. The light diffusion sheet according to claim 8, wherein the light diffusing agent comprises beads having a mean particle size from 1 micrometer to 50 micrometers.

10. The light diffusion layer according to claim 1, wherein a component that attenuates the blue light is inside the binder.

11. The backlight unit according to claim 7; wherein the light diffusion layer is 1 micrometer to 30 micrometers in thickness.

12. The backlight unit according to claim 11, wherein the light diffusing agent comprises beads having a mean particle size from 1 micrometer to 50 micrometers.

13. The backlight unit according to claim 7, wherein a component that attenuates the blue light is inside the binder.

* * * * *